March 18, 1969     A. WINTER ET AL     3,433,087
TRANSMISSION SHIFT DEVICE
Filed Aug. 18, 1967
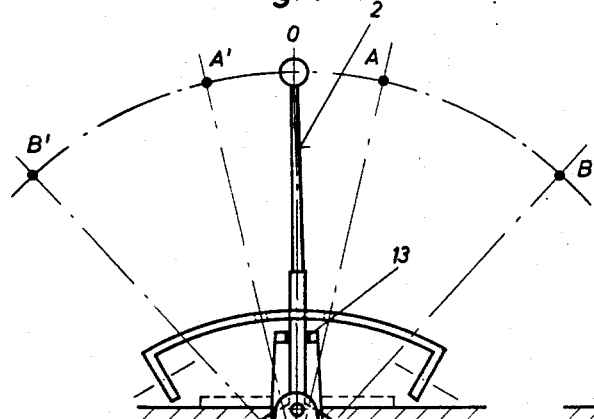
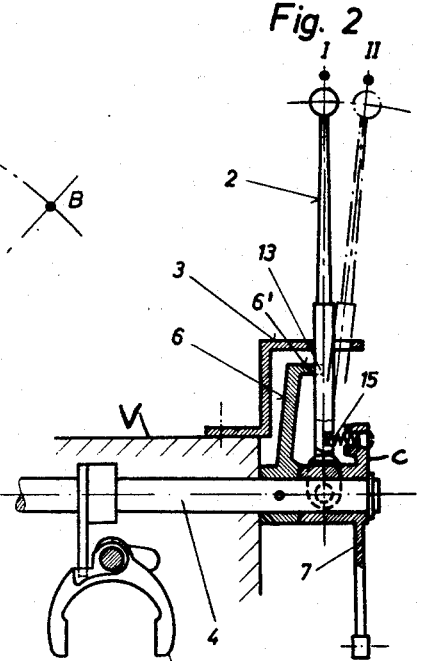
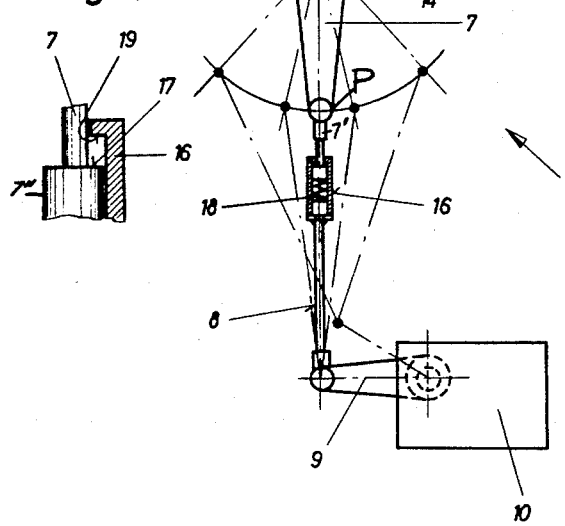
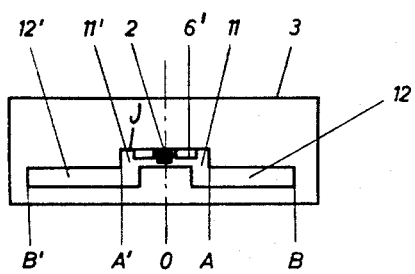
August Winter
Egon Mann
Willi Pfeiffer
Wilhelm Arnegger
INVENTOR
BY *Albert M. Zalkind*
ATTORNEY

United States Patent Office 3,433,087
Patented Mar. 18, 1969

3,433,087
TRANSMISSION SHIFT DEVICE
August Winter, Egon Mann, and Willi Pfeiffer, Friedrichshafen, and Wilhelm Arnegger, Ittendorf, Germany, assignors to Zahnradfabrik Friedrichshafen Aktiengesellschaft, Friedrichshafen, Germany
Filed Aug. 18, 1967, Ser. No. 661,701
Claims priority, application Germany, Aug. 19, 1966, Z 12,385
U.S. Cl. 74—473  7 Claims
Int. Cl. G05g 9/10

ABSTRACT OF THE DISCLOSURE

The invention features a mechanism for controlling two independently operable speed transmissions utilizing a manually rockable lever pivotally connected to a shaft which carries a shift fork for controlling one transmission. Accordingly, rocking of the lever in a first plane transverse to the shaft actuates the shift fork. The lever can also be swung in the plane of the shaft into a second plane at an angle to the first plane and be rocked in the second plane to control a second transmission. The lever is connected through a lost motion mechanism to the second transmission whereby rocking of the lever in the first plane controls the first transmission without affecting the second transmission. A slotted guide plate is provided to insure the lever being rocked selectively in either of the two planes.

Prior art devices have heretofore used a pair of shift levers for this purpose requiring separate and independent motions of each, wherein due care had to be exercised by the operator since an error could lead to transmission breakdowns. The present invention eliminates any possibility of such error.

In brief, the invention comprises a single stick shift lever secured to a rockable shaft which shaft carries a yoke that couples a ratio gear transmission to the vehicle drive shaft. The lever can be rocked in a first plane normal to the shaft plane and in either direction for forward or reverse drive of such transmission. The lever can also be moved into a second plane for rocking a collar on the aforementioned shaft, which rocking actuates a control device for an infinitely variable drive. A lost motion mechanism is utilized to prevent actuation of the control device when the lever is being actuated in the first plane.

In the drawings:
FIGURE 1 shows a front view of the arrangement of the shift lever and the particular components connected thereto for effecting the purposes of the invention;
FIGURE 2 is a side view partially in section showing the shift lever in position for controlling the ratio gear transmission drive;
FIGURE 3 is a plan view illustrating guide slot components of the arrangement, and,
FIGURE 4 is a fragmentary partial section illustrating the relationship of certain of the components.

Referring to the drawing, the invention comprises a shift lever 2 which passes through a slotted guide plate means 3 suitably and fixedly secured to the vehicle V in a well understood manner. The shift lever 2 can reversibly rock the shaft 4 in plane I (FIG. 2) via an arm 6 pinned to the shaft 4 which effects an abutment means engageable by said shift lever. Shaft 4 carries a control means such as a shifting fork 5 keyed thereto; fork 5 will be understood to be coupled to a mechanism (not shown) for effecting coupling of gears thus effecting control of one transmission.

The lever 2 has a yoke Y pivotably mounted by means of screws 14 on a collar C which carries a lever 7. Collar C is rotatably mounted on shaft 4 so that lever 7 can actuate a linkage mechanism to be described for controlling a device 10 that controls a torque converter or other infinitely variable device. Lever 2 can rock in plane II (FIG. 2) in order to reversibly swing lever 7.

Arm 6 has a pair of spaced ears 6' having a recess 13 therebetween in which the lever is disposed when the lever is vertical, in plane I, and maintained vertical by spring 15 socketed in collar C. From this position it can be moved out of the recess 13 and upon being rocked in plane II can swing the arm 7 without affecting the arm 6.

Referring now to FIGURE 3, it will be noted that the slotted plate 3 has a pair of slots 11 and 11' parallel to the axis of shaft 4 joined by a slot J. By comparison with FIGURE 1 it will be noted that lever 2 can be swung in slot J from neutral position into either slot 11 or 11', from the 0 position (neutral) to the shoulder positions A and A'. The slots 11 and 11' will be understood to permit a reversible rocking to the limiting position of shoulders A and A', of arm 6 by lever 2 so as to rock shaft 4, and thus yoke 5, to control forward and reverse travel. This, of course, occurs when lever 2 is in plane I.

In order for the lever 2 to be rocked in plane I without affecting any actuation of the infinitely variable control device 10, a lost motion connection is provided between the extremity of the lever 7 and the control device 10. Thus considering FIGURES 1 and 4, the extremity 7' of lever 7 is a short rod pivotally connected at P to lever 7, passing through a top aperture of a sleeve 16 and having an enlarged end button 7" slidable in the sleeve and abutting compression spring 18. A lost motion gap is provided between the inner surface 19 of the top closure portion of sleeve 16 and the upper surface 17 of the button 7". Sleeve 16 is integral with a rod 8 pivotally connected to lever 9 which actuates control device 10.

The aforementioned gap permits play of the arm 7 when lever 2 is swung from the zero position into the limit-positions A or A', thereby preventing any pull on a connecting rod 8 when lever 2 is swung in plane I. The spring 18 is provided to maintain stabilization of the lost motion arrangement.

When it is desired to operate the control device 10, lever 2 is shifted into slot 11 or 11' and into plane II against the compression of spring 15 (FIGURE 2) which normally maintains the lever vertical. Having been thus shifted into plane II, it may then be rocked to the limiting position of shoulder B of slot 12 or the limiting position of shoulder B' of slot 12'. In so doing the button 7' will close the gap and abutting the surface 19 will rock lever 9 via the rod 8. Such rocking will be clockwise or counter-clockwise as viewed in FIGURE 1 for forward or reverse travel. The lever 2 can be set selectively at any point in slot 12 or 12' to give infinitely variable speed control in either direction; shoulders B and B' limit maximum forward and reverse travel. Thus lever 2 can be used to control the travel speed of a vehicle in either direction very smoothly and at any desired rate.

In the event that it is desired to reverse direction of travel when the lever is in plane II, it must first, of course, be shifted back into plane I in order to be moved via slot 11 or 11' into slot 12 or 12' as the case may be. This produces a shift back to the ratio gearing but with a minimum of speed change-over from the infinitely variable gear. Therefore the loads on the synchronizing device of the ratio gearing are extremely small because the vehicle momentum is braked by the infinitely variable gear which must necessarily move to the slowest speed position in order to traverse slot 11 or 11' in moving to slot 12 or 12', as the case may be.

As seen from FIGURE 3, slot J is offset from the pair of slots 12 and 12' to control the setting of lever 2 in either plane for transverse rocking; recess 13 being registered with the 0 position of slot J when both transmissions are in neutral.

We claim:

1. In a mechanism for controlling a pair of independent transmissions, a rockable shaft having a first control means to control one transmission when said shaft is rocked, a shift lever, support means whereby said shift lever is carried on said shaft and is rockable in a first plane transversely thereof, actuating means engageable by said shift lever whereby said shaft is rocked when said shift lever is rocked in said first plane, said support means including connection means for disposing said shift lever in a second plane for rocking therein when disengaged from said actuating means; and second control means actuatable by rocking of said shift lever in said second plane for controlling a second transmission.

2. In a mechanism as set forth in claim 1, said support means comprising a relatively rotative collar on said shaft and a pivotal connection between said shift lever and said collar whereby said shift lever may be swung in the plane of said shaft into said second plane.

3. In a mechanism as set forth in claim 2, said second control means comprising a lever carried by said collar for effecting control of said second transmission when said lever is rocked in said second plane, and linkage means actuated by said latter lever and comprising a lost motion mechanism for actuating said second control means, whereby no actuation takes place thereof when said shift lever is rocked in said first plane.

4. In a mechanism as set forth in claim 1, the actuating means whereby said shaft is rocked by said shift lever comprising an arm keyed on said shaft and having a recess with spaced sides in which recess said shift lever is disposed when in said first plane, said shift lever being reversibly engageable with said sides of said recess when rocked in said first plane for reversible rocking of said shaft; said recess having an open side so that said shift lever may be actuated into said second plane to effect release from said arm.

5. In a mechanism as set forth in claim 1, a fixed guide means for said lever provided with a pair of slots in planes parallel to the axis of said shaft, said lever being rockable in said first plane into a respective slot for effecting forward or reverse control of said one transmission; said latter means comprising a second pair of slots each of which is joined to a slot of said first pair of slots and said second pair of slots extending transversely of the shaft axis in opposite directions; said lever being movable from said first plane into said second plane via either of said first pair of slots and into either of a respective slot of said second pair of slots.

6. In a mechanism as set forth in claim 1, the actuating means whereby said shaft is rocked by said shift lever comprising an arm keyed on said shaft and having a recess with spaced sides in which recess said shift lever is disposed when in said first plane, said shift lever being reversibly engageable with either side of said recess when rocked in said first plane, said recess having an open side so that said shift lever may be actuated out of said recess into said second plane to effect release from said arm; a fixed guide means for said lever provided with a pair of slots in respective planes parallel to said shaft, said shift lever being rockable in said first plane into a respective slot for effecting forward or reverse control of said one transmission, said guide means comprising a second pair of slots each joined to a respective slot of said first pair of slots; said second pair of slots extending transversely in opposite directions of said first pair of slots; said lever being movable from said first plane into said second plane into either of said second pair of slots via one of said first pair of slots for respective forward and reverse travel control, and rockable within predetermined limits in either of said second pair of slots to selectively control speed of said second transmission.

7. In a mechanism as set forth in claim 6, said guide means comprising a plate through which said slots are disposed; and said plate being disposed radially outward of the recess in said arm relative to said shaft; a transverse joining slot joining said first pair of slots and being longitudinally offset from said second pair of slots with respect to said shaft; said shift lever being diposable in neutral position in said joining slot.

References Cited
UNITED STATES PATENTS 3,055,445  9/1962  Mendez et al. _____ 74—471
3,323,607  6/1967  Futamata _____ 74—471

MILTON KAUFMAN, *Primary Examiner.*

U.S. Cl. X.R.

74—471; 174—110; 260—37, 57, 2